(12) United States Patent
Joshua et al.

(10) Patent No.: US 10,769,098 B2
(45) Date of Patent: Sep. 8, 2020

(54) METHODS AND SYSTEMS FOR ACCESSING HOST MEMORY THROUGH NON-VOLATILE MEMORY OVER FABRIC BRIDGING WITH DIRECT TARGET ACCESS

(71) Applicant: Marvell World Trade Ltd., St. Michael (BB)

(72) Inventors: Eitan Joshua, Ramot Menashe (IL); Scott Furey, Cupertino, CA (US); Dimitry Melts, San Jose, CA (US); Noam Mizrahi, Modi'in (IL)

(73) Assignee: Marvell Asia Pte, Ltd., Singapore (SG)

( * ) Notice: Subject to any disclaimer, the term of this patent is extended or adjusted under 35 U.S.C. 154(b) by 306 days.

(21) Appl. No.: 15/479,005

(22) Filed: Apr. 4, 2017

(65) Prior Publication Data

US 2017/0286363 A1    Oct. 5, 2017

Related U.S. Application Data

(60) Provisional application No. 62/317,896, filed on Apr. 4, 2016, provisional application No. 62/317,902, filed on Apr. 4, 2016.

(51) Int. Cl.
| | |
|---|---|
| *G06F 15/167* | (2006.01) |
| *G06F 15/173* | (2006.01) |
| *H04L 29/06* | (2006.01) |
| *G06F 13/28* | (2006.01) |
| *G06F 3/06* | (2006.01) |

(52) U.S. Cl.
CPC ........ *G06F 15/17331* (2013.01); *G06F 3/061* (2013.01); *G06F 3/0655* (2013.01); *G06F 3/0688* (2013.01); *G06F 13/28* (2013.01); *H04L 63/0428* (2013.01); *H04L 69/08* (2013.01)

(58) Field of Classification Search
None
See application file for complete search history.

(56) References Cited

U.S. PATENT DOCUMENTS

| | | | |
|---|---|---|---|
| 7,493,424 B1 * | 2/2009 | Bali .................... | G06F 13/28 709/212 |
| 8,611,352 B2 | 12/2013 | Mizrahi et al. | |

(Continued)

FOREIGN PATENT DOCUMENTS

| | | |
|---|---|---|
| WO | WO 2009143381 | 11/2009 |
| WO | WO 2013109640 | 7/2013 |

*Primary Examiner* — Mohamed Ibrahim

(57) ABSTRACT

Embodiments described herein provide a method for accessing a host memory through non-volatile memory over fabric bridging with direct target access. A first memory access command encapsulated in a first network packet is received at a memory interface unit and from a remote direct memory access (RDMA) interface and via a network fabric. The first memory access command is compliant with a first non-volatile memory interface protocol and the first network packet is compliant with a second non-volatile memory interface protocol. The first network packet is unwrapped to obtain the first memory access command. The first memory access command is stored in a work queue using address bits of the work queue as a pre-set index of the first memory access command. The first memory access command is sent from the work queue based on the pre-set index to activate a first target storage device.

20 Claims, 9 Drawing Sheets

(56) References Cited

U.S. PATENT DOCUMENTS

| | | |
|---|---|---|
| 8,948,173 B2 | 2/2015 | Elmaliah |
| 9,191,315 B1 | 11/2015 | Mizrahi et al. |
| 9,565,269 B2 | 2/2017 | Malwankar et al. |
| 2005/0157732 A1* | 7/2005 | Joy ................. H04L 12/462 370/401 |
| 2013/0198312 A1* | 8/2013 | Tamir ................. G06F 15/167 709/212 |
| 2016/0085718 A1* | 3/2016 | Huang ................. H04L 29/08 709/213 |
| 2016/0127492 A1* | 5/2016 | Malwankar ......... H04L 67/2842 709/212 |

* cited by examiner

METHODS AND SYSTEMS FOR ACCESSING HOST MEMORY THROUGH NON-VOLATILE MEMORY OVER FABRIC BRIDGING WITH DIRECT TARGET ACCESS

CROSS-REFERENCE TO RELATED APPLICATION

This disclosure claims the benefit under 35 U.S.C. § 119(e) of U.S. Provisional Patent Application Nos. 62/317,902 and 62/317,896, both filed Apr. 4, 2016, each of which is hereby incorporated by reference herein in its respective entirety.

FIELD OF USE

This disclosure relates to remote access to storage media over a storage networking fabric, and specifically, to access a non-volatile memory through non-volatile memory over fabric bridging via a hardware interface.

BACKGROUND OF THE DISCLOSURE

The background description provided herein is for the purpose of generally presenting the context of the disclosure. Work of the inventors hereof, to the extent the work is described in this background section, as well as aspects of the description that does not otherwise qualify as prior art at the time of filing, are neither expressly nor impliedly admitted to be prior art against the present disclosure.

In a computing system, to access a solid-state drive (SSD), a host processor typically communicates with the SSD controller via a non-volatile memory host controller interface, which is usually adapted for a peripheral component interconnect express (PCIe) bus. The non-volatile memory host controller interface adopts a non-volatile memory express (NVMe) protocol, which defines communication between the host processor and a target device for accessing an non-volatile memory (NVM) sub-system. Conventionally, the host processor is directly connected with the NVM sub-system, e.g., a storage device, via a PCIe bus.

SUMMARY

Embodiments described herein provide a method for accessing a host memory through non-volatile memory over fabric bridging with direct target access. A first memory access command encapsulated in a first network packet is received at a memory interface unit and from a remote direct memory access (RDMA) interface and via a network fabric. The first memory access command is compliant with a first non-volatile memory interface protocol and the first network packet is compliant with a second non-volatile memory interface protocol. The first network packet is unwrapped to obtain the first memory access command. The first memory access command is stored in a work queue using address bits of the work queue as a pre-set index of the first memory access command. The first memory access command is sent from the work queue based on the pre-set index to activate a first target storage device.

In some implementations, in response to sending the first memory access command, memory transaction data compliant with the first non-volatile memory interface protocol is received at the memory interface unit and from the first target storage device. The memory interface unit is configured to encapsulate the memory transaction data in a second network packet compliant with the second non-volatile memory interface protocol, and send the second network packet to the RDMA interface via the network fabric.

In some implementations, the memory transaction data is passed, from the first target storage device to the RDMA interface and through the memory interface unit, at a size substantially similar to a size of the second network packet without buffering the transaction data.

In some implementations, the second network packet is sent to the RDMA interface as a notification that a memory transaction is initiated at the first storage device. The RDMA interface is activated to serve the memory transaction.

In some implementations, the RDMA interface is activated by storing the memory transaction data into a response queue designated to the RDMA interface, and wherein the work queue is designated to the first storage device.

In some implementations, when the first memory access command indicates a read operation, memory data compliant with the first non-volatile memory interface protocol is received, at the memory interface unit and from the first target storage device. The memory interface unit is configured to encapsulate the memory data in a second network packet compliant with the second non-volatile memory interface protocol, and send the second network packet to the RDMA interface via the network fabric.

In some implementations, when the first memory access command capsule includes a write command, data encapsulated in a second network packet compliant with the second non-volatile memory interface protocol is received at the memory interface unit and from the RDMA interface. The memory interface unit is configured to unwrap the second network packet to obtain the data compliant with the first non-volatile memory interface protocol, and send the data at a size of the second network packet to the first target storage device.

In some implementations, the work queue storing the first memory access command and an RDMA response queue storing memory transactions are maintained. The work queue is paired with the RDMA response queue.

In some implementations, a second target memory device operable under the second memory access protocol is connected to the memory interface unit.

In some implementations, the memory interface unit is configured to receive from the RDMA interface and via a network fabric, a second memory access command encapsulated in a second network packet. The second memory access command is compliant with the first non-volatile memory interface protocol and the second network packet is compliant with the second non-volatile memory interface protocol. The second network packet is unwrapped to obtain the second memory access command. The second memory access command is stored in a second work queue using address bits of the second work queue as a pre-set index of the second memory access command. The second memory access command is sent from the second work queue based on the pre-set index to activate the second target storage device.

BRIEF DESCRIPTION OF THE DRAWINGS

Further features of the disclosure, its nature and various advantages will become apparent upon consideration of the following detailed description, taken in conjunction with the accompanying drawings, in which like reference characters refer to like parts throughout, and in which.

DETAILED DESCRIPTION

Figure 1:
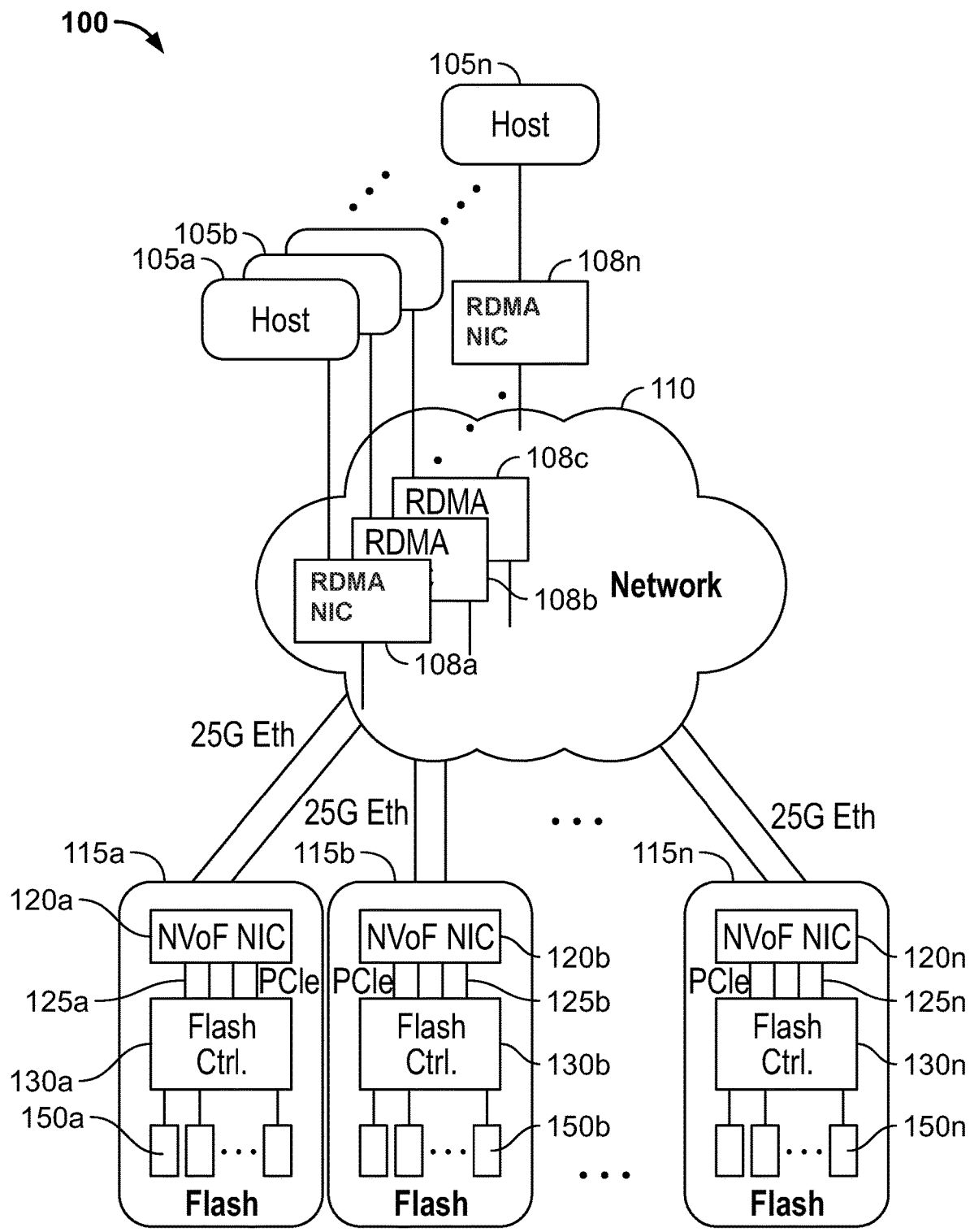
FIG. 1 is a block diagram illustrating an example architecture of a non-volatile memory over fabric (NVMeOF) system employing an NVMeOF network interface card (NIC) as an interface with an NVMe storage device, according to some embodiments described herein.

This disclosure describes methods and systems for remotely accessing a non-volatile memory by a host through non-volatile memory over fabric via a hardware interface.

The Non-Volatile Memory Over Fabric (NVMeOF) is a protocol for communication between a host processor an NVM sub-system over a shared network fabric. The NVMeOF architecture includes a network-side (e.g., a memory access request initiator side) interface, e.g., a remote direct memory access (RDMA) interface that interacts with the host processor, and an NVMeOF interface (e.g., a target storage side) that interacts with NVMe devices and/or sub-systems. The RDMA interface and the NVMeOF interface are connected and configured to communicate via a networking fabric, e.g., the Ethernet, etc., in an embodiment. In this way, the host processor is configured to access large numbers of NVMe devices and/or sub-systems that are located remotely from the host processor.

Existing solutions to implement the NVMeOF interface include having a processor that executes software instructions to handle an access request and protocol translation between NVMe and NVMeOF, e.g., a read or write request, etc., from the host processor to visit a memory unit in the NVMe device or subs-system. This software-based approach incurs a non-trivial burden on the processor, and also increases read/write latency because of the overhead time for the processor to issue and load a memory access request in compliance with the NVMeOF protocol. In addition, the software-based approach generally adopts a store-and-forward method, e.g., all memory access commands and memory data to be read or to be written for a memory read or write transaction are received and stored at a buffer, and then the memory commands and data are translated to a suitable protocol before the NVMe data is written to the target storage device, or the NVMeOF data is read by the host processor. The time needed for the memory commands and data to be loaded into and translated at the buffer also increases latency to the corresponding read or write operation.

Embodiments described herein provide a hardware-based component that is configured to directly read/write data with a memory unit in the NVMe device or sub-system, and directly communicate with the RDMA interface (e.g., the host initiator of a memory access request) coupled to a host processor via a shared network fabric. Specifically, the hardware-based component includes a network interface card (NIC) to interface with the network and one or more PCIe ports each to be paired with an NVMe device such that the hardware configuration of the component allows a data path to pass through the component between the NVMe device or sub-system and the remote host processor.

In this way, the protocol translation from NVMeOF to NVMe or NVMe to NVMeOF is thus handled on a hardware level with significantly reduced processing resources compared to systems operating on a software level. The hardware-based component is configured to receive NVMeOF command capsules, which contain one or more NVMe memory read or write commands (or other memory access commands) encapsulated in a network packet compliant with NVMeOF, and optionally contains the command data, from the network fabric, based upon which the hardware-based component is configured to prepare an input/output queue of jobs to be performed on a target NVMe device. On the other hand, the hardware-based component is configured to receive an NVMe target memory transaction (e.g., a memory operation session at the target storage device for a write or read operation) from an NVMe device or sub-system, and serve the target memory transaction by activating corresponding read and write functions with the remote host over the RDMA interface (e.g., the RDMA transport layer). Thus, each NVMeOF command capsule is unwrapped by the hardware-based component to recover the NVMe data contained therein when the NVMeOF command capsule is received from the network fabric; and each NVMe memory transaction is encapsulated in compliance with NVMeOF by the hardware-based component when the NVMe memory transaction is received from the target NVMe device. Memory commands or data are passed from the network fabric to the target NVMe device, or vice versa, capsule-by-capsule at the size of a command capsule, e.g., similar to the size of a network packet. As such, the NVMe device or sub-system is configured to directly serve the input/output queues of the host processor and implement a memory transaction at a target memory unit because memory access commands and memory data is transmitted between the NVMe device or sub-system and the network fabric (and the host processor resides therein) on a packet-by-packet basis, instead of loading all memory access commands and memory data into a buffer before the memory transaction is implemented on the target memory unit by the conventional store-and-forward software-based approach described above. In this way, the NVMeOF interface is operated via the hardware-based component without incurring heavy burden to a central processor (e.g., the storage aggregator processor, etc.), and latency in memory access is improved without the overhead processor issuance time to issue software instructions and buffer-loading time to load all memory access commands and data needed for a memory transaction in a conventional store-and-forward approach.

FIG. 1 is a block diagram illustrating an example architecture of an NVMeOF system 100 employing an NVMeOF NIC as an interface with an NVMe storage device, according to some embodiments described herein. Host processors 105a-n (herein collectively referred to as 105) of one or more computing systems are each paired with a RDMA NIC 108a-n (herein collectively referred to as 108), respectively, which are configured to send memory access requests, e.g., in a NVMeOF command capsule, to one or more NVMe target devices or sub-systems 115a-n (herein collectively referred to as 115). The memory access requests are sent, as described above, encapsulated in a network packet compliant with NVMeOF, over a network fabric 110, e.g., the 25 G Ethernet. Each NVMe target device 115 is equipped with an NVMeOF NIC 120a-n (herein collectively referred to as 120), which is configured to interface between the network fabric 110. For example, the NVMeOF NIC 120 is configured to unwrap the NVMeOF command capsules received from the network fabric into NVMe commands that are compatible with the NVMe target device 115. Or the NVMeOF NIC 120 is configured to receive NVMe memory transactions from the NVMe target device 115 and encapsulate the NVMe memory transaction data into NVMeOF-compliant capsule.

The NVMeOF NIC 120 is configured to communicate with a flash memory controller 130a-n (herein collectively referred to as 130) via a PCIe bus 125a-n (herein collectively referred to as 125) with an NVMe extension. Each flash memory controller 130 is configured to control and implement a read or write operation with the flash memory 150a-n (herein collectively referred to as 150).

Figure 2:
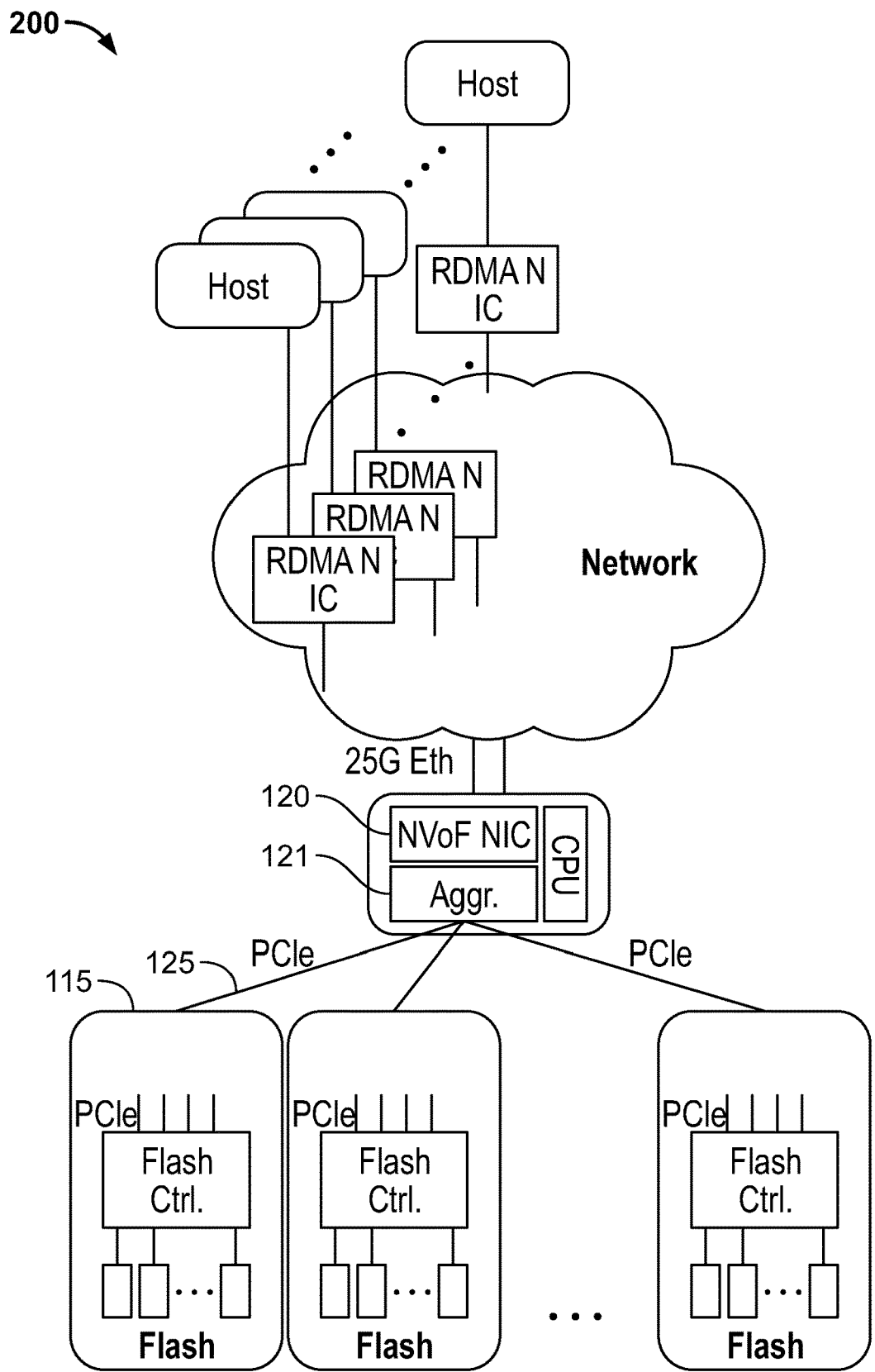
FIG. 2 is a block diagram illustrating an example architecture of an aggregated NVMeOF system 200 employing an NVMeOF NIC as an aggregated interface with a plurality of NVMe storage devices, according to some embodiments described herein.

FIG. 2 is a block diagram illustrating an example architecture of an aggregated NVMeOF system 200 employing an NVMeOF NIC as an aggregated interface with a plurality of NVMe storage devices, according to some embodiments described herein. Instead of having an NVMeOF NIC 120 equipped with every NVMe target device 115, an aggregated NVMeOF NIC 120 is used with an aggregator 121 that has a plurality of PCIe ports, each being paired with an NVMe target device 115. Thus the centralized NVMeOF NIC 120 is configured to interface with the NVMe target device 115 through a PCIe port at the aggregator 121. In this way, hardware configuration and upgrade is streamlined with no additional hardware change to any existing NVMe target device 115. The system architecture 200 thus provides a scalable storage architecture as a new NVMe target device can be added to the system as long as a PCIe port is paired with the new NVMe target device at the aggregator 121. Thus the system can be linearly scaled by adding or removing target devices, increasing or decreasing ports, without being limited to the ability of the aggregator 121 to serve more target storage devices and higher bandwidths. In addition, with the aggregator 121, all the target devices 115 are presented to the host as a single Internet Protocol (IP) address.

Figure 3:
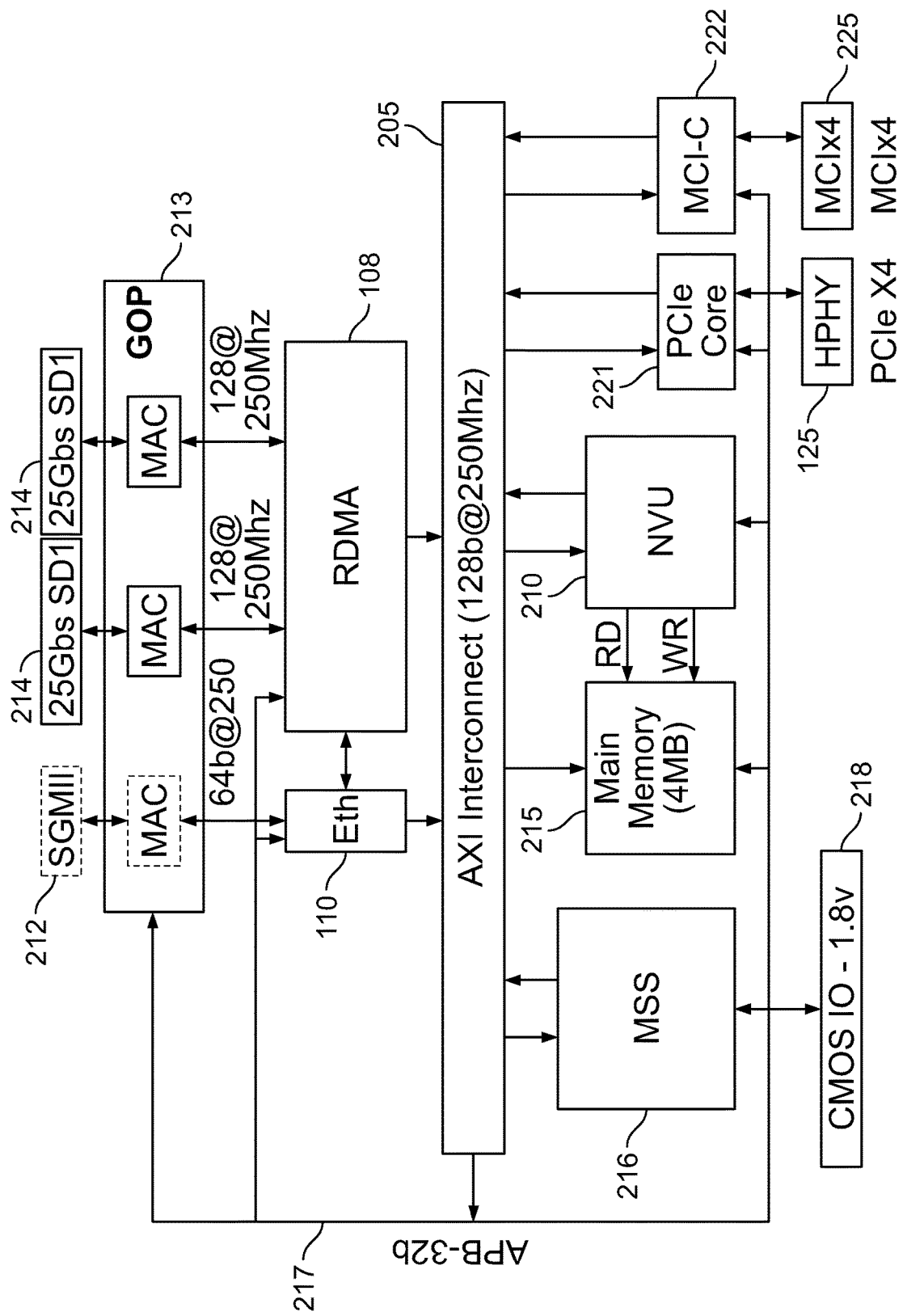
FIG. 3 is a block diagram illustrating an example fabric structure of the NVMeOF system described in FIGS. 1-2, according to some embodiments described herein.

FIG. 3 is a block diagram illustrating an example circuit structure of the NVMeOF system described in FIGS. 1-2, according to some embodiments described herein. An advanced peripheral bus (APB) 217, or an AXI interconnect bus, is configured to connect a non-volatile unit (NVU) 210, a main memory 215, a PCIe core 221, a multimedia card interface core (MCI-C) 222, an AXI interconnect bus 205, Ethernet fabric 110, an RDMA interface 108, the media access control (MAC) unit 213 together via various configuration ports.

The RDMA interface 108 (e.g., similar to RDMA NIC 108 in FIGS. 1-2) is configured to receive a memory access request from the MAC 213, which is in turn configured to receive the memory access request from a host processor (e.g., 105 in FIG. 1) via the upper layer, e.g., via a 25 Gbs secure digital interface 214. The MAC 213 is also configured to receive multimedia data via a Serial Gigabit Media Independent Interface (SGMII) 212 from the upper layer and send the multimedia data to the Ethernet 110, in an embodiment.

The RDMA interface 108 is configured to send, via the AXI interconnect bus 205, a memory access request relating to the NVMe target device (e.g., 105 in FIG. 1) in an NVMeOF command capsule to the NVU 210, which may in turn parse the NVMeOF command capsule into a number of read or write tasks and store the read or write tasks in an I/O queue at the memory 215. The I/O queue is designated for a particular NVMe target device.

The NVU is also configured to receive or send memory access transactions to or from the memory supervision system (MSS) 216 (e.g., similar to the flash memory controller 130 in FIG. 1). The NVU 210 is also configured to transmit data to or from the NVMe target memory via the PCIe connection, e.g., through the PCIe core 221 to the physical layer bus 125, or through the MCI port 222 to the MCI bus 225. The PCIe core 221 or the MCI port 222 is configured to be paired with a designated NVMe target device or sub-system.

Figure 4:
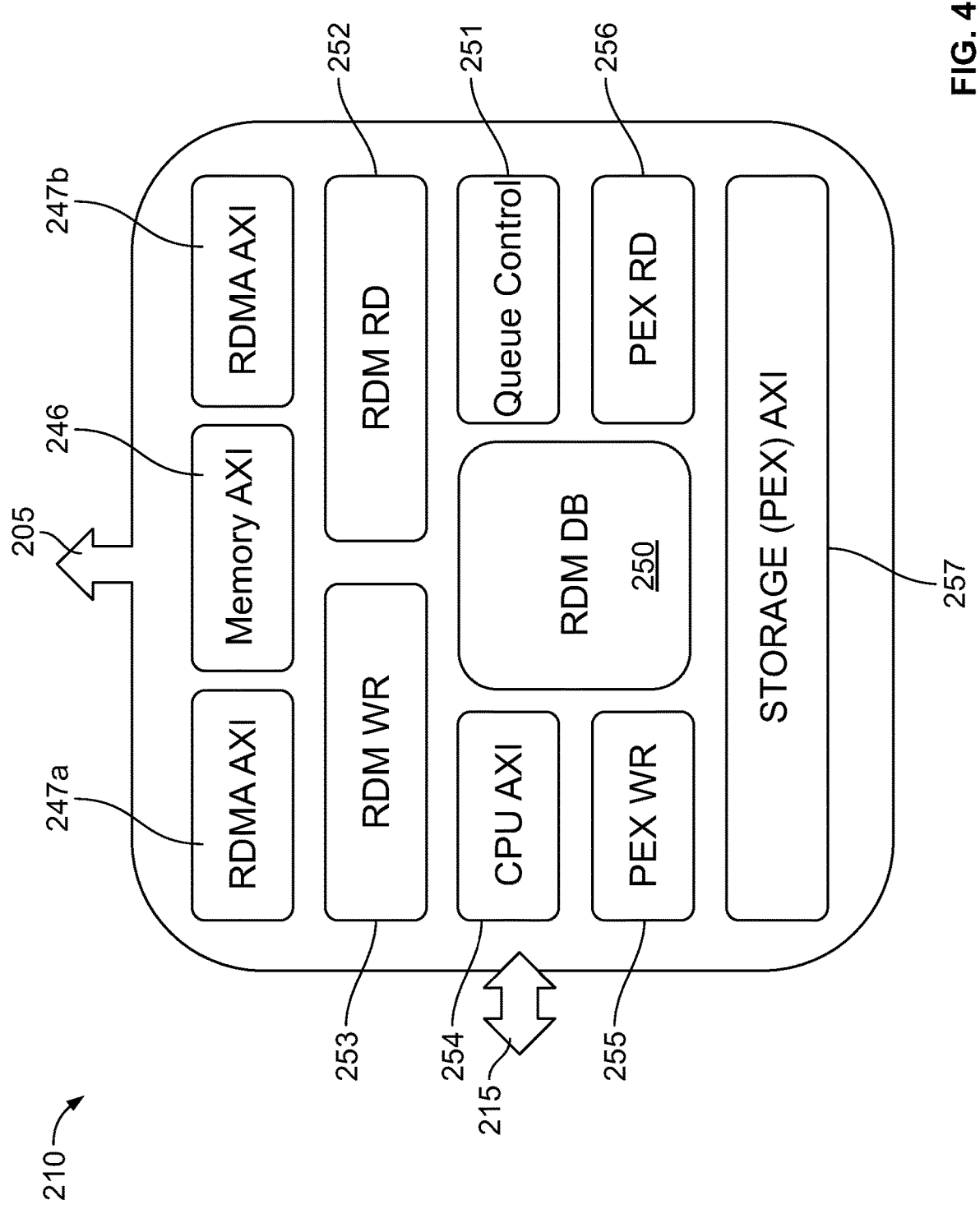
FIG. 4 is a block diagram illustrating an example circuit structure of an NV unit employed by the NVMeOF system described in FIGS. 1-3 to interface between the network fabric and the NVMe storage device, according to some embodiments described herein.

FIG. 4 is a block diagram illustrating an example circuit structure of a non-volatile interface unit (e.g., NVU 210) employed by the NVMeOF system described in FIGS. 1-3 to interface between the network fabric and the NVMe storage device, according to some embodiments described herein. The NVU 210 includes AXI ports such as but not limited to the RDMA AXI 247a-b, memory AXI 246 and storage AXI 257, CPU AXI 254, and/or the like, which are configured to connect via the AXI interconnect bus (217 in FIG. 3) to the RDMA (108 in FIG. 3), memory (215 in FIG. 3), storage (e.g., via PCIe 125 in FIG. 3), CPU (if necessary), respectively.

The NVU 210 includes an RDM database 250 that stores identifying information of the RDMA interface (e.g., 108 in FIG. 3). The NVU 210 further includes an RDM write unit 253 that is configured to receive and handle a write command from the RDMA interface (e.g., 108 in FIG. 3), and a RDM read unit 252 that is configured to receive and handle a read command from the RDMA interface (e.g., 108 in FIG. 3). The NVU 210 further includes a storage device write unit 255 that is configured to pass through a write command and data to be written to the target storage device, and a storage device read unit 256 that is configured to pass through a read command and data to be read from the target storage device. Further details of implementations of an NVMeOF read or write command capsule are discussed in conjunction with FIGS. 5-6 and 7-8, respectively.

The NVU 210 is configured, in an embodiment, to maintain a number of queues (e.g., up to 256 NVMe queues in total) to store a number of memory access commands (read or write), e.g., in the memory 215 in FIG. 3. In an embodiment, the number of queues maintained is selectable and typically is pre-defined, for instance either upon manufacture or at startup. For example, each queue is configured to store up to 128 queue entries, and the number of queue entries of each queue is pre-defined. In some implementations, data is stored in the form of a scattered gather list (SGL) in the host memory, and support in-capsule data.

A queue controller 251 in the NVU 210 is configured to control and manage queue entries such as a submission queue entry (SQE) that stores a read or write command to be implemented, a completion queue entry (CQE) that stores a read or write command that has been completed, a response queue (RSQ) entry that stores a response from an NVMe target device in response to a write or read command, and/or the like. The NVU 210 is thus configured to activate an NVMe target storage device by queueing the SQEs, and activate the RDMA by queueing the RSQs. The SQEs are stored in a work queue designated to an NVMe target device using address bits of the work queue as a pre-set index for the respective SQE, as the queue controller 251 does not use a software-based approach to generate an index value and allocate the index value to the SQE. Thus, when the work queue is visited, each SQE is sent to the respective NVMe target device that is designated to the work queue based on an order defined by the pre-set index. Each SQE has a size substantially similar to a network packet, and thus the NVMe memory commands, stored as SQEs, are passed through the work queue on a packet-by-packet basis. In addition, the index of each SQE (e.g., the address bits) are used to relate a response, a memory transaction, etc. from the target storage device to the original read or write command capsule received from the RDMA interface 108. In this way, the RDMA interface (e.g., the original initiator of the memory access command), the SQE, the response and corresponding memory transaction from the NVMe target device, are all related by the index.

At the NVU 210, whenever a NVMeOF command capsule is received from the RDMA interface 108, the capsule analysis (e.g., parsing, modifying, storing, etc.) is performed by the NVU hardware, and the command capsule is forwarded to the target storage device, e.g., SSD, by the NVU hardware. For example, an incoming command capsule is configured to be modified, in some implementations, by replacing the most significant bits (MSB) of the buffer address of the respective SQE in order to relate a memory transaction from the target storage device to the original command capsule. Thus the memory transaction is assigned to the appropriate RDMA which sends the initial command capsule. When the command capsule is scheduled for service, a doorbell interrupt, e.g., an interrupt message that configures the doorbell variable associated with the respective SQE queue where the command capsule is stored as being visited, will be sent by the NVU to the SSD controller. Further details of implementations of a command capsule are discussed in conjunction with FIGS. 5-9. Any RDMA queue, e.g., queues that store NVMeOF memory access command capsules from the RDMA, is paired with an NVMe queue, e.g., a queue that stores NVMe memory transaction to the target storage device, which is aligned with the NVMeOF specification. In this way, the NVU 210 is configured to unwrap the NVMeOF command capsules to NVMe commands suitable for use by an NVMe target storage device.

In some implementations, a memory transaction received from the PCIe bus (125 in FIG. 3) is configured to propagate by the NVU 210 as AXI transaction and served by the NVU 210 that in turn activates the RDMA to serve the memory transaction by initiating a read or write operation.

Figure 5:
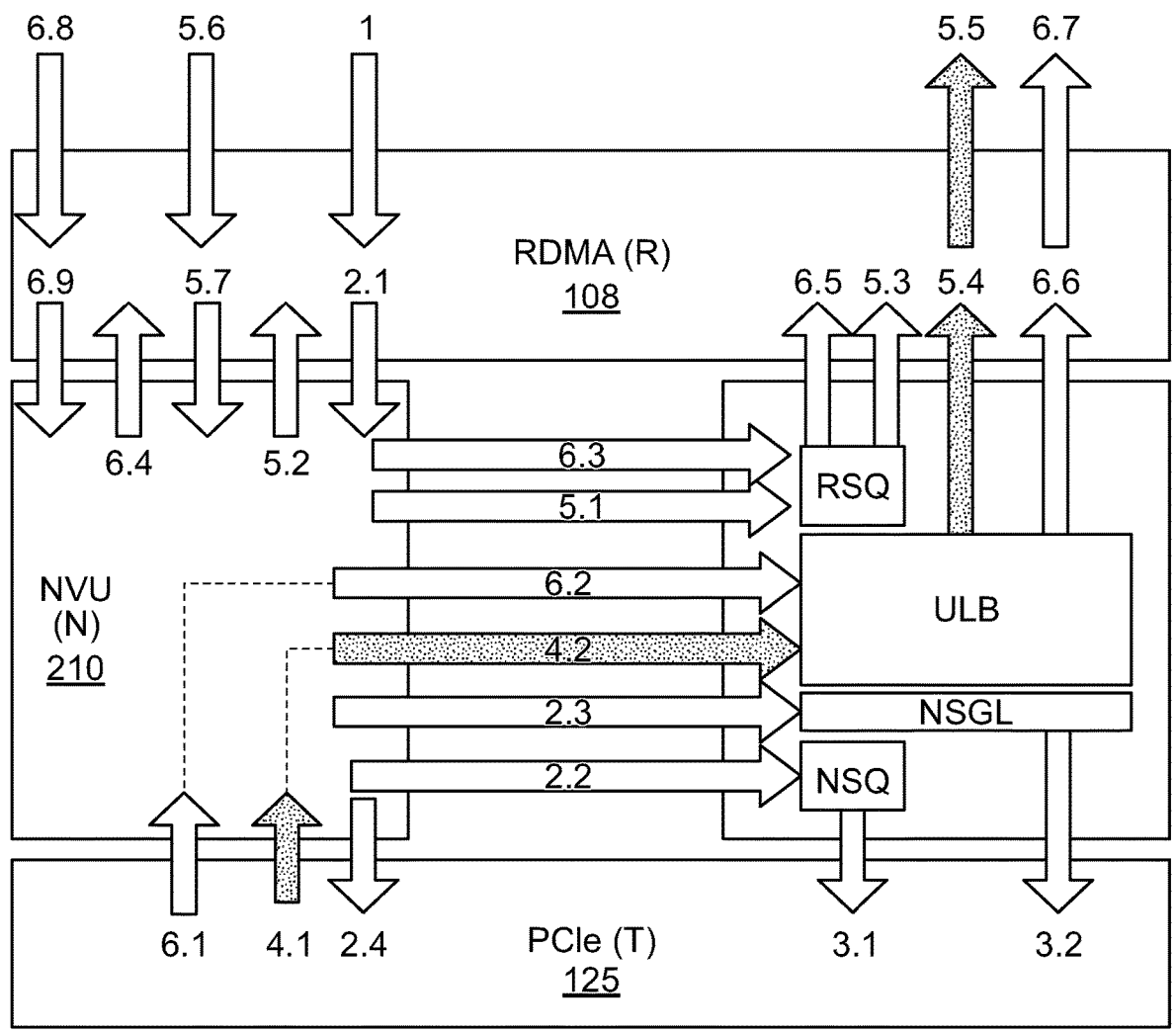
FIGS. 5-6 are flow diagrams illustrating an example read flow performed by the NVMeOF system described in FIGS. 1-4, according to some embodiments described herein.
Figure 6:
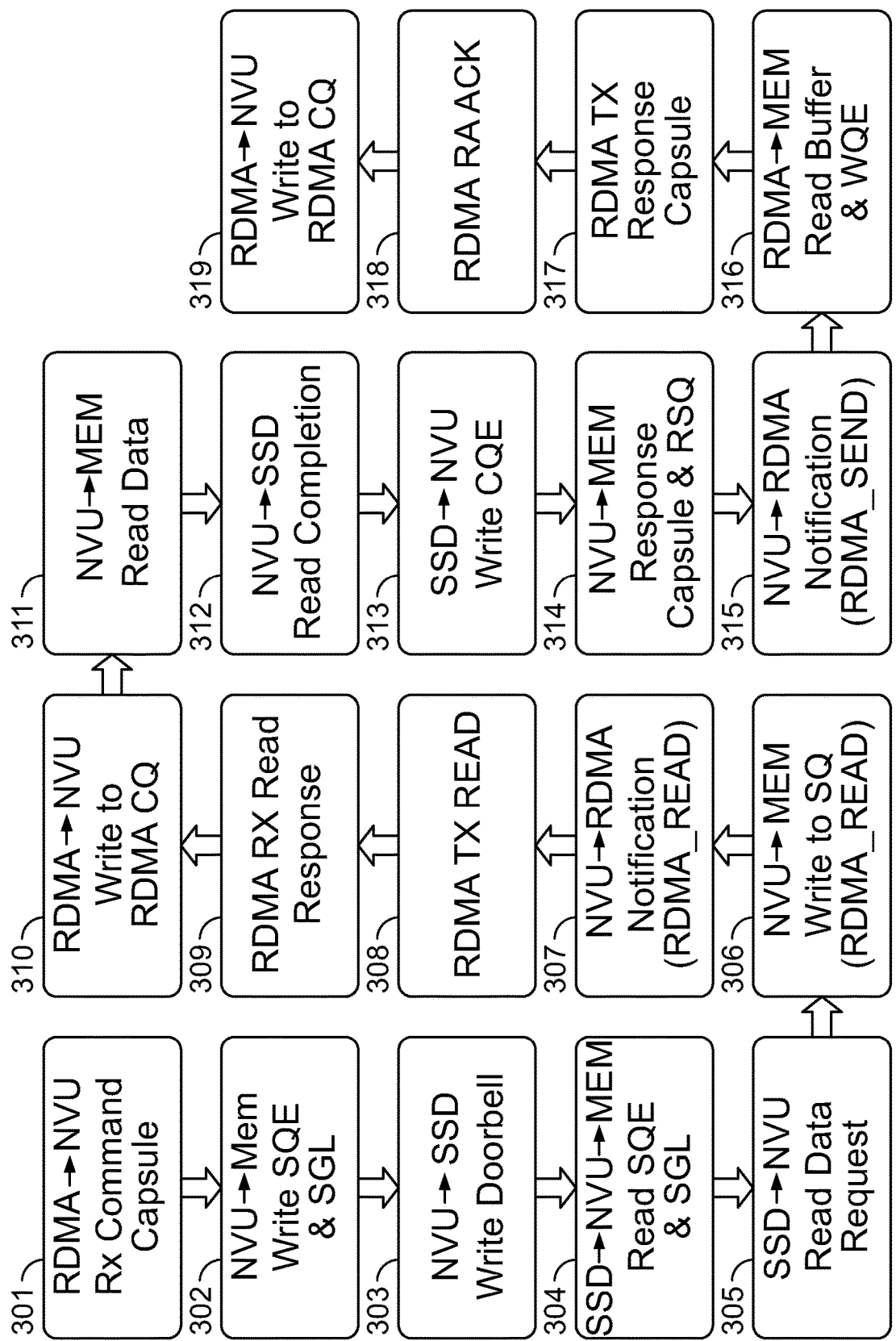

FIGS. 5-6 are flow diagrams illustrating an example implementation of an NVMe read command performed by the NVMeOF system described in FIGS. 1-4, according to some embodiments described herein. Starting at 301 in FIG. 6, the RDMA interface 108 is configured, in an embodiment, to generate and send to the NVU 210 a memory access command capsule compliant with NVMeOF, which includes one or more NVMe read commands, e.g., see also arrows 1 and 2.1 in FIG. 5. At 302, the NVU 210 is configured to unwrap the NVMeOF read command capsule to obtain and store the one or more NVMe read commands in SQEs (e.g., see also arrow 2.2 in FIG. 5) and/or in a SGL (e.g., see also arrow 2.3 in FIG. 5) in the memory 215. At 303, the NVU 210 is configured to write a doorbell, e.g., a message to initiate access to the SQE or SGL queue, via the PCIe bus 125, to the target storage device SSD (e.g., see also arrow 2.4 in FIG. 5). At 304, the target SSD is configured to read the SQE and SGL in the memory 215 (e.g., see also arrows 3.1 and 3.2 in FIG. 5). At 305, the target SSD is configured to pass to the NVU 210 the requested read data (e.g., see arrow 4.1 in FIG. 5). At 306, the NVU 210 is configured to encapsulate the read data as NVMeOF packets and store in the memory 215 (e.g., see also arrow 4.2 in FIG. 5) and write the control command associated with the read data as a write queue entry (WQE) in the submission queue (e.g., see also arrow 5.1 in FIG. 5).

At 307, the NVU 210 is configured to encapsulate a read notification in an NVMeOF capsule and send to the RDMA interface 108 (e.g., see also arrow 5.2 in FIG. 5). At 308, the RDMA interface 108 is configured to receive read data encapsulated in NVMeOF packets from the memory 215 (e.g., see also arrows 5.3 and 5.4 in FIG. 5) and transmit read data to the host processor (e.g., see also arrow 5.5 in FIG. 5). At 309, the RDMA interface 108 is configured to receive a read response from the host processor (e.g., see also arrow 5.6 in FIG. 5). At 310, the RDMA interface 108 is configured to write to a completion queue in the NVU 210 that the read operation is completed (e.g., see also arrow 5.7 in FIG. 5).

At 311, the NVU 210 is configured to receive a read transaction from the SSD via the PCIe 125. At 312, the NVU 210 is configured to send a read completion status to the target SSD. At 313, the target SSD is configured to write the read transaction to the CQE of the NVU 210 (e.g., see also arrow 6.1 in FIG. 5). At 314, the NVU 210 is configured to send a response capsule to the memory 215 (e.g., see also arrow 6.2 in FIG. 5), which in turn saves the response capsule in the RSQ (e.g., see also arrow 6.3 in FIG. 5). At 315, the NVU 210 is configured to send a read notification to the RDMA interface 108 (e.g., see also arrow 6.4 in FIG. 5). At 316, the RDMA interface 108 is configured to read the read buffer and the WQEs in the memory 215 (e.g., see also arrows 6.5 and 6.6 in FIG. 5). At 317, the RDMA interface 108 transmits a response capsule to the host processor (e.g., see arrow 6.7 in FIG. 5). At 318, the RDMA interface 108 receives an acknowledgement from the host processor (e.g., see also arrow 6.8 in FIG. 5). At 319, the RDMA interface 108 is configured to write to the completion queue in NVU 210 that the NVMe read command is completed.

As shown in FIG. 5, each NVMeOF read command capsule (e.g., 2.1) is unwrapped to obtain the NVMe command at NVU 210 as the NVMeOF read command capsule is received, and the NVMe command is saved as SQE (e.g., 2.2) based on the address bits of the SQE queue. In this way, the NVMe command is internally indexed by the address bits, and is then implemented command-by-command to the target SSD via the PCIe 125 based on an order defined by the index. The index is then sent to the target SSD with the NVMe read command. In response to each NVMeOF read command, the read data from the target SSD via the PCIe 125 is received at the NVU 210 and then encapsulated as an NVMeOF packet through the data path 4.1 and 4.2 at a granularity of the size of the NVMeOF packet. As the index is also returned to the NVU 210 with the read data, the index is used to identify the RDMA interface, e.g., the initiator of the read command, and thus the RDMA interface is paired with the NVMeOF packet. Thus the read data is passed through the NVU 210 from the target SSD to the network fabric approximately packet-by-packet with little or no buffering, instead of being loaded into a buffer until all read data is fully loaded before the read data can start to be passed to the network fabric as in the conventional store-and-forward software-based approach.

Figure 7:
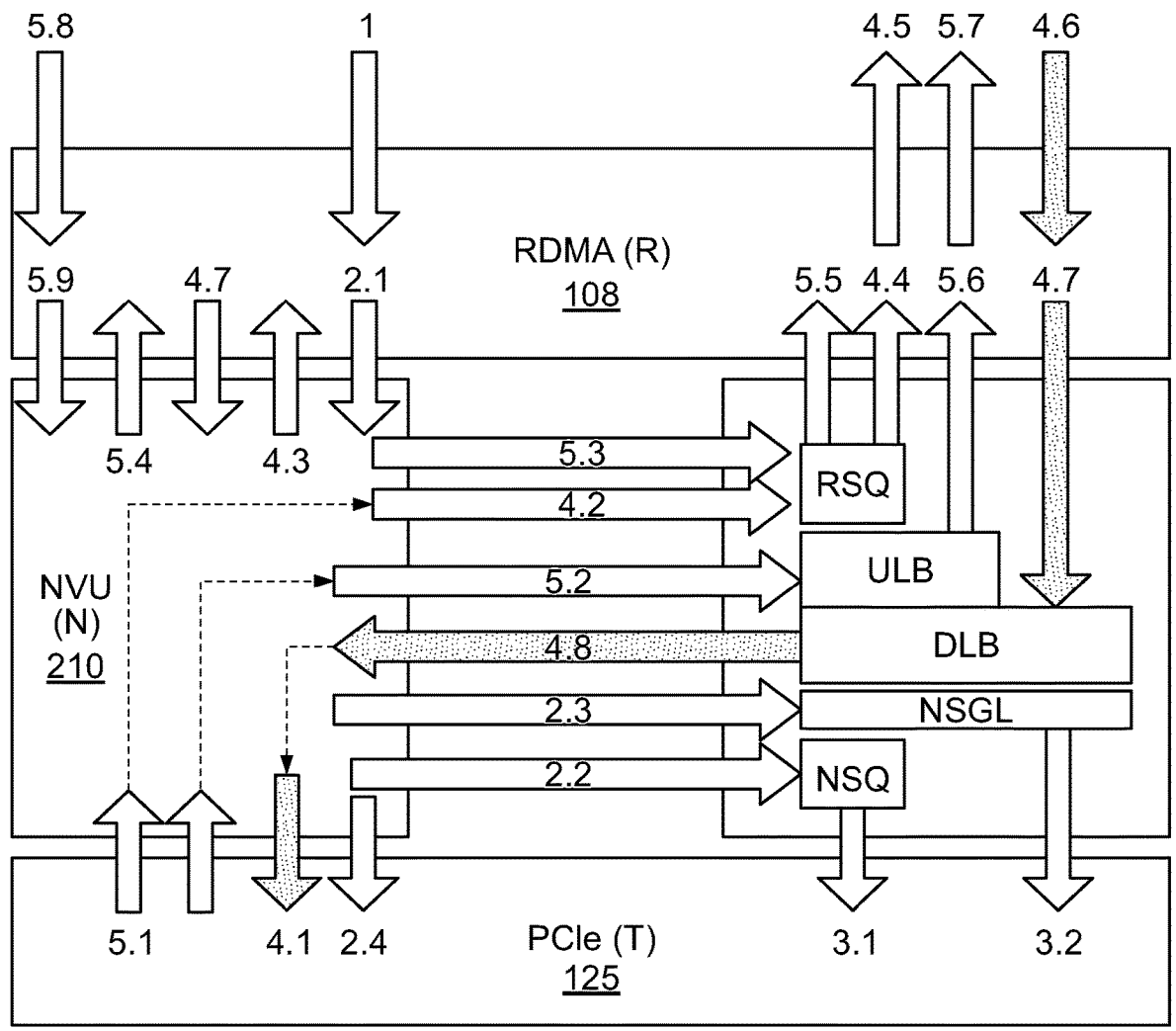
FIGS. 7-8 are flow diagrams illustrating an example write flow performed by the NVMeOF system described in FIGS. 1-4, according to some embodiments described herein.
Figure 8:
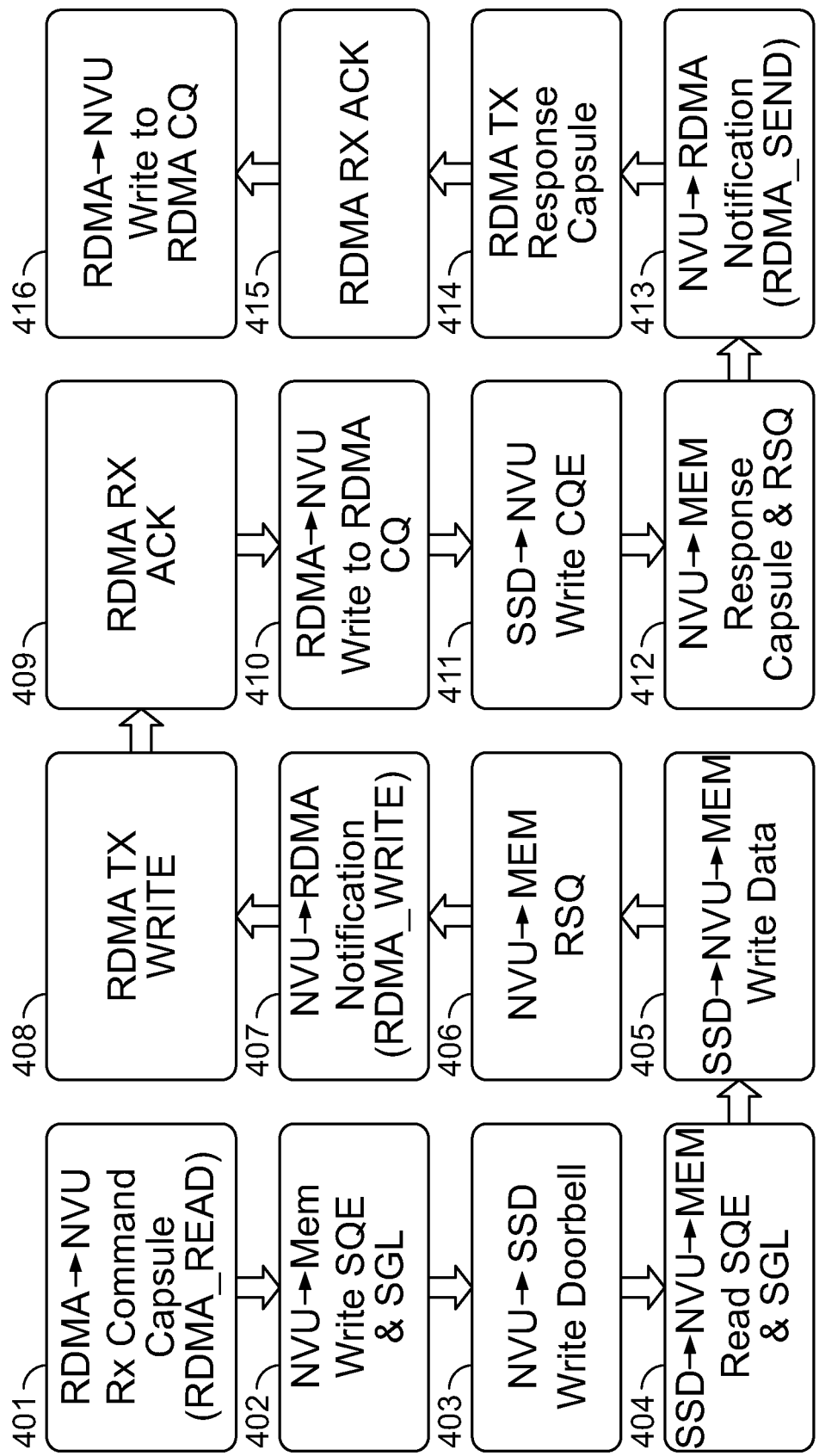

FIGS. 7-8 are flow diagrams illustrating an example implementation of an NVMe write command performed by the NVMeOF system described in FIGS. 1-4, according to some embodiments described herein. Starting at 401 in FIG. 8, the RDMA interface 108 is configured to generate and send to the NVU 210 a memory access command capsule compliant with NVMeOF, which includes one or more NVMe write commands, e.g., see also arrows 1 and 2.1 in FIG. 7. At 402, the NVU 210 is configured to unwrap the NVMeOF command capsule to obtain the one or more NVMe write commands and save in SQE (e.g., see also arrow 2.2 in FIG. 7) and/or in SGL (e.g., see also arrow 2.3 in FIG. 75) in the memory 215. At 403, the NVU 210 is configured to write a doorbell, e.g., a message to initiate access to the SQE or SGL queue, via the PCIe bus 125, to the target storage device SSD (e.g., see also arrow 2.4 in FIG. 7). At 404, the target SSD is configured to read the SQE and SGL in the memory 215 (e.g., see also arrows 3.1 and 3.2 in FIG. 7). At 405, the target SSD is configured to read the data to be written from the target SSD via the NVU 210 (e.g., see arrows 4.8 and 4.1 in FIG. 7). At 406, the NVU 210 is configured to write to the RSQ in the memory 215 (e.g., see also arrow 4.2 in FIG. 7).

At 407, the NVU 210 is configured to encapsulate a write notification as a NVMeOF packet and send the NVMeOF packet to the RDMA interface 108 (e.g., see also arrow 4.3 in FIG. 7). For example, the NVMeOF packet includes a response entry from the NVMe target device, and a data block representing the write data. At 408, the RDMA interface 108 is configured to read the write data from the WQE in the memory 215 (e.g., see also arrow 4.4 in FIG. 7) and transmit write data to the host processor (e.g., see also arrow 4.5 in FIG. 7). At 409, the RDMA interface 108 is configured to receive a write acknowledgement on the RDMA transfer at the RDMA packet level from the host processor (e.g., see also arrow 4.6 in FIG. 7). At 410, a completion queue entry is written in the NVU 210 that the write operation is completed (e.g., see also arrow 4.7 in FIG. 7).

At 411, the target SSD is configured to write a write transaction to the CQE with the NVU 210 (e.g., see 5.1 in FIG. 7). At 412, the NVU 210 is configured to generate and send an NVMeOF response capsule to the memory 215 (e.g., see 5.2 in FIG. 7), which in turn saves the response capsule in the WQE (e.g., see 5.3 in FIG. 7). At 413, the NVU 210 is configured to send the NVMeOF response capsule as a write notification to the RDMA interface 108 (e.g., see 5.4 in FIG. 7). At 414, the RDMA interface 108 is configured to read the write transaction from the memory 215 (e.g., see arrows 5.5 and 5.6 in FIG. 7), and transmits the response to the host processor (e.g., see 5.7 in FIG. 7). At 415, the RDMA interface 108 receives an acknowledgement from the host processor (e.g., see 5.8 in FIG. 7). At 416, the RDMA interface 108 is configured to write to the completion queue in NVU 210 that the NVMe write command is completed (e.g., see 5.9 in FIG. 7).

As shown in FIG. 7, each NVMeOF write command capsule (e.g., 2.1) is unwrapped to obtain the NVMe write command at NVU 210 as the NVMeOF read command capsule is received, e.g., by reading a command identifier and any other segment descriptor of the capsule to separate the SQE and additional memory data (if any) in the command capsule. The NVMe write command is then saved as SQE (e.g., 2.2) in a work queue based on the address bits of the SQE work queue, which are used to internally index the respective SQE entry. The NVMe write command, which is stored as a SQE with with the internal index by the address bits, and is then transmitted out of the work queue command-by-command and implemented on the target SSD via the PCIe 125 based on an order defined by the index. In response to each NVMeOF write command, the data to be written to the target SSD via the PCIe 125 is received at the NVU 210 as NVMeOF packets and each NVMeOF packet is then unwrapped to obtain the NVMe data through the data path 4.8 and 4.1 at a granularity of the size of the NVMeOF write command capsule, e.g., the packet size. Thus the write data is passed through the NVU 210 from the network fabric to the target SSD approximately packet-by-packet with little or no buffering, instead of being loaded into a write buffer until all write data is fully loaded before the write data can start to be passed to the target SSD as in the conventional store-and-forward software-based approach.

Figure 9:
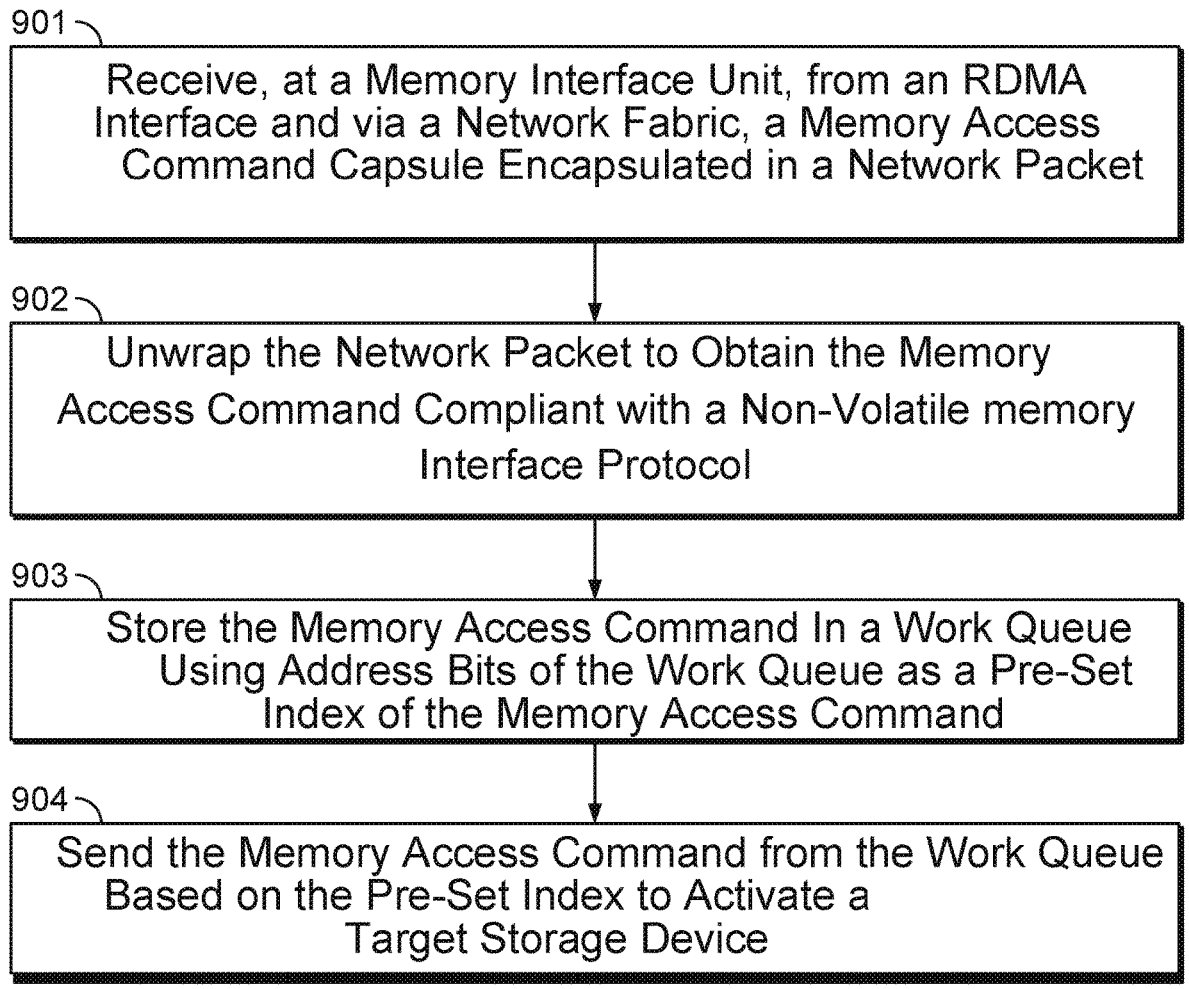
FIG. 9 is a logic flow diagram illustrating an example operation performed by the NV unit described in FIG. 4 to translate data and control commands between the network fabric and the NVMe storage device, according to some embodiments described herein.

FIG. 9 is a logic flow diagram illustrating an example operation performed by the NV unit described in FIG. 4 to translate data and control commands between the network fabric and the NVMe storage device, according to some embodiments described herein. At 901, a memory access command (e.g., an NVMe write or read command) encapsulated in a network packet (e.g., an NVMeOF command capsule, etc.) is received at a memory interface unit (e.g., NVU 210) from an RDMA interface (e.g., 108 in FIG. 1) and via a network fabric (e.g., 25 G Ethernet in FIG. 1). At 902, the network packet is unwrapped to obtain the memory access command. At 903, the memory access command is stored in a work queue, e.g., as SQEs in an I/O queue (e.g., see also 2.2 in FIG. 5), using address bits of the I/O queue as internal indices of the plurality of memory access tasks. At 904, the memory access command is sent from the work queue based on the pre-set index to activate the target storage device.

Various embodiments discussed in conjunction with FIGS. 1-9 are performed by various electronic components of one or more electronic circuits, such as but not limited to an integrated circuit, and/or the like. Various components discussed throughout this disclosure such as, but not limited to the NVoF NIC 120, RDMA NIC 108, NVU 210, FEC encoder 102, memory 215, MSS 216, and/or the like, are configured to include a set of electronic circuit components, and communicatively operate on one or more electronic circuits. Each electronic circuit is configured to include any of, but not limited to logic gates, memory cells, amplifiers, filters, and/or the like. Various embodiments and components disclosed herein are configured to be at least partially operated and/or implemented by processor-executable instructions stored on one or more transitory or non-transitory processor-readable media.

While various embodiments of the present disclosure have been shown and described herein, such embodiments are provided by way of example only. Numerous variations, changes, and substitutions relating to embodiments described herein are applicable without departing from the disclosure. It is noted that various alternatives to the embodiments of the disclosure described herein may be employed in practicing the disclosure. It is intended that the following claims define the scope of the disclosure and that methods and structures within the scope of these claims and their equivalents be covered thereby.

While operations are depicted in the drawings in a particular order, this is not to be construed as requiring that such operations be performed in the particular order shown or in sequential order, or that all illustrated operations be performed to achieve the desirable results.

The subject matter of this specification has been described in terms of particular aspects, but other aspects can be implemented and are within the scope of the following claims. For example, the actions recited in the claims can be performed in a different order and still achieve desirable results. As one example, the process depicted in FIG. 10 does not necessarily require the particular order shown, or sequential order, to achieve desirable results. In certain implementations, multitasking and parallel processing may be advantageous. Other variations are within the scope of the following claims.

What is claimed is:

1. A method for accessing a host memory through non-volatile memory over fabric bridging with direct target access, the method comprising:
receiving, at a memory interface unit, from a remote direct memory access (RDMA) interface and via a network fabric, a first memory access command compliant with a first non-volatile memory interface protocol that was encapsulated at the RDMA interface, without modifying the first memory access command, in a first network packet compliant with a second non-volatile memory interface protocol different from the first non-volatile memory interface protocol;
unwrapping, by the memory interface unit, the first network packet to obtain the encapsulated first memory access command compliant with the first non-volatile memory interface protocol;
storing the first memory access command, as obtained from the first network packet, in a work queue using address bits of the work queue as a pre-determined index of the first memory access command; and
sending the first memory access command, as obtained from the first network packet, from the work queue based on the pre-set index to a first target storage device.

2. The method of claim 1, further comprising:
in response to sending the first memory access command, receiving, at the memory interface unit and from the first target storage device, memory transaction data compliant with the first non-volatile memory interface protocol;
encapsulating, by the memory interface unit, the memory transaction data in a second network packet compliant with the second non-volatile memory interface protocol;
identifying the pre-determined index associated with the memory transaction data; and
sending the second network packet to the RDMA interface based on the pre-determined index via the network fabric.

3. The method of claim 2, further comprising:
passing, from the first target storage device to the RDMA interface and through the memory interface unit, the memory transaction data at a size substantially similar to a size of the second network packet without buffering the transaction data.

4. The method of claim 2, further comprising:
sending the second network packet to the RDMA interface as a notification that a memory transaction is initiated at the first storage device,
wherein the RDMA interface is activated to serve the memory transaction.

5. The method of claim 1, further comprising:
connecting a second target memory device operable under the second memory access protocol to the memory interface unit.

6. The method of claim 5, further comprising:
receiving, at a memory interface unit, from the RDMA interface and via a network fabric, a second memory access command compliant with the first non-volatile memory interface protocol that was encapsulated at the RDMA interface, without modifying the second memory access command, in a second network packet compliant with the second non-volatile memory interface protocol;
unwrapping the second network packet to obtain the encapsulated second memory access command compliant with the first non-volatile memory interface protocol;
storing the second memory access command, as obtained from the second network packet, in a second work queue using address bits of the second work queue as a pre-determined index of the second memory access command; and
sending the second memory access command, as obtained from the second network packet, from the second work queue based on the pre-set index to activate the second target storage device.

7. The method of claim 1, wherein the RDMA interface is activated by:
storing the memory transaction data into a response queue designated to the RDMA interface, and wherein the work queue is designated to the first storage device.

8. The method of claim 1, further comprising:
when the first memory access command indicates a read operation,
receiving, at the memory interface unit and from the first target storage device, memory data compliant with the first non-volatile memory interface protocol;
encapsulating, by the memory interface unit, the memory data in a second network packet compliant with the second nonvolatile memory interface protocol; and
sending the second network packet to the RDMA interface via the network fabric.

9. The method of claim 1, further comprising:
when the first memory access command capsule includes a write command,
receiving, at the memory interface unit and from the RDMA interface, data encapsulated in a second network packet compliant with the second non-volatile memory interface protocol;
unwrapping, by the memory interface unit, the second network packet to obtain the data compliant with the first non-volatile memory interface protocol; and
sending the data at a size of the second network packet to the first target storage device.

10. The method of claim 1, further comprising:
maintaining the work queue storing the first memory access command and an RDMA response queue storing memory transactions, wherein the work queue is paired with the RDMA response queue.

11. A system for accessing a host memory through non-volatile memory over fabric bridging with direct target access, the system comprising:
a memory interface unit configured to:
receive, from a remote direct memory access (RDMA) interface and via a network fabric, a first memory access command that was encapsulated at the RDMA interface, without modifying the first memory access command, in a first network packet compliant with a second non-volatile memory interface protocol different from the first non-volatile memory interface protocol; and unwrap the first network packet to obtain the encapsulated first memory access command compliant with the first non-volatile memory interface protocol; and a memory unit configured to:

store the first memory access command, as obtained from the first network packet, in a work queue using address bits of the work queue as a pre-determined index of the first memory access command; and send the first memory access command, as obtained from the first network packet, from the work queue based on the predetermined index to activate a first target storage device.

12. The system of claim 11, wherein the memory interface unit is further configured to:

in response to sending the first memory access command, receive, from the first target storage device, memory transaction data compliant with the first non-volatile memory interface protocol;

encapsulate, by the memory interface unit, the memory transaction data in a second network packet compliant with the second non-volatile memory interface protocol;

identify the pre-determined index associated with the memory transaction data; and send the second network packet to the RDMA interface based on the pre-determined index via the network fabric.

13. The system of claim 12, wherein the memory interface unit is further configured to:

pass, from the first target storage device to the RDMA interface, the memory transaction data at a size substantially similar to a size of the second network packet without buffering the memory transaction data at the memory interface unit.

14. The system of claim 12, wherein the memory interface unit is further configured to:

send the second network packet to the RDMA interface as a notification that a memory transaction is initiated at the first storage device, wherein the RDMA interface is activated to serve the memory transaction.

15. The system of claim 11, further comprising:

a second target memory device operable under the second memory access protocol to the memory interface unit.

16. The system of claim 15, wherein the memory interface unit is further configured to:

receive, from the RDMA interface and via a network fabric, a second memory access command compliant with the first non-volatile memory interface protocol that was encapsulated at the RDMA interface, without modifying the second memory access command, in a second network packet compliant with the second non-volatile memory interface protocol;

unwrap the second network packet to obtain the encapsulated second memory access command compliant with the first non-volatile memory interface protocol;

store the second memory access command, as obtained from the second network packet, in a second work queue using address bits of the second work queue as a pre-set index of the second memory access command; and send the second memory access command, as obtained from the second network packet, from the second work queue based on the pre-set index to activate the second target storage device.

17. The system of claim 11, wherein the RDMA interface is activated by:

storing the memory transaction data into a response queue designated to the RDMA interface, and wherein the work queue is designated to the first storage device.

18. The system of claim 11, wherein the memory interface unit is further configured to:

when the first memory access command indicates a read operation, receive, from the first target storage device, memory data compliant with the first non-volatile memory interface protocol;

encapsulate the memory data in a second network packet compliant with the second non-volatile memory interface protocol; and send the second network packet to the RDMA interface via the network fabric.

19. The system of claim 11, wherein the memory interface unit is further configured to:

when the first memory access command capsule includes a write command, receive, from the RDMA interface, data encapsulated in a second network packet compliant with the second non-volatile memory interface protocol;

unwrap the second network packet to obtain the data compliant with the first non-volatile memory interface protocol; and send the data at a size of the second network packet to the first target storage device.

20. The system of claim 11, wherein the memory unit is further configured to:

maintain the work queue storing the first memory access command and an RDMA response queue storing memory transactions, wherein the work queue is paired with the RDMA response queue.

* * * * *